(12) United States Patent
Hara

(10) Patent No.: US 11,221,711 B2
(45) Date of Patent: Jan. 11, 2022

(54) INPUT CONTROL DEVICE, INPUT CONTROL METHOD AND DISPLAY DEVICE THAT ESTIMATE OPERATOR POSITION RELATIVE TO A TOUCH PANEL

(71) Applicant: Mitsubishi Electric Corporation, Tokyo (JP)

(72) Inventor: Hideki Hara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/040,174

(22) PCT Filed: May 14, 2018

(86) PCT No.: PCT/JP2018/018584
§ 371 (c)(1),
(2) Date: Sep. 22, 2020

(87) PCT Pub. No.: WO2019/220510
PCT Pub. Date: Nov. 21, 2019

(65) Prior Publication Data
US 2021/0124455 A1    Apr. 29, 2021

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01); *G06F 2203/04803* (2013.01)

(58) Field of Classification Search
CPC .. G06F 3/04883; G06F 3/0416; G06F 3/0418; G06F 3/04886; G06F 2203/04803
See application file for complete search history.

(56) References Cited

U.S. PATENT DOCUMENTS

2016/0246331 A1*    8/2016 Cho .................. G06F 1/1652

FOREIGN PATENT DOCUMENTS

JP    2012-194692 A    10/2012

* cited by examiner

*Primary Examiner* — Yaron Cohen
(74) *Attorney, Agent, or Firm* — Birch, Stewart, Kolasch & Birch, LLP

(57) ABSTRACT

An input control device includes a touch information acquiring unit for acquiring touch information from a touch panel, a touch angle calculating unit for calculating an angle of a touched area on the basis of the touch information acquired by the touch information acquiring unit, an operating direction estimating unit for estimating the direction of an operator who has touched the touch panel, on the basis of both the angle of the touched area, the angle being calculated by the touch angle calculating unit, and an angle threshold, a detection information acquiring unit for acquiring detection information from a sensor for detecting a part of the operator's body, a relative position estimating unit for estimating a relative position of the part of the operator's body with respect to the touch panel on the basis of the detection information acquired by the detection information acquiring unit, and a threshold correcting unit for correcting the angle threshold on the basis of the relative position of the part of the operator's body with respect to the touch panel, the relative position being estimated by the relative position estimating unit.

11 Claims, 10 Drawing Sheets

FIG. 9A

| from -25 Degrees to -10 Degrees | from -35 Degrees to -20 Degrees | from -45 Degrees to -30 Degrees |
|---|---|---|
| from -35 Degrees to -20 Degrees | from -45 Degrees to -30 Degrees | from -55 Degrees to -40 Degrees |
| from -45 Degrees to -30 Degrees | from -55 Degrees to -40 Degrees | from -65 Degrees to -50 Degrees |

FIG. 9B

| from 30 Degrees to 45 Degrees | from 20 Degrees to 35 Degrees | from 10 Degrees to 25 Degrees |
|---|---|---|
| from 40 Degrees to 55 Degrees | from 30 Degrees to 45 Degrees | from 20 Degrees to 35 Degrees |
| from 50 Degrees to 65 Degrees | from 40 Degrees to 55 Degrees | from 30 Degrees to 45 Degrees |

INPUT CONTROL DEVICE, INPUT CONTROL METHOD AND DISPLAY DEVICE THAT ESTIMATE OPERATOR POSITION RELATIVE TO A TOUCH PANEL

TECHNICAL FIELD

The present disclosure relates to an input control device, an input control method, and a display device.

BACKGROUND ART

A technique of, in vehicle-mounted display systems, detecting which occupant, out of occupants sitting in the driver's seat and the front seat, has touched a touch panel has been studied.

For example, Patent Literature 1 discloses a display device including a control unit. When a user touches an operation display surface, the control unit identifies an operating point where the touch operation has been performed, on the basis of a detection result provided by a touch sensor. Then, the control unit acquires a result of detection by a proximity sensor and identifies a direction of a finger with respect to the operation display surface when there is an approaching object in the vicinity of the operating point. Then, the control unit identifies the user from a user location direction by reference to a user identification table when specifying the user location direction from the direction of the finger. Then, the control unit refers to a processing table on the basis of the operating point and the identified user, to perform a process of controlling the display information.

CITATION LIST

Patent Literature

Patent Literature 1: JP 2012-194692 A

SUMMARY OF INVENTION

Technical Problem

A problem with the display device disclosed by Patent Literature 1 is that although an angle of the touch is calculated and which one of occupants sitting in the driver's seat and the front seat has touched the touch panel is determined, a sufficient degree of determination accuracy cannot be provided because a threshold for the determination is fixed.

The present disclosure is made in order to solve the above-mentioned problem, and it is therefore an object of the present disclosure to provide an input control device that can accurately determine which one of occupants sitting in the driver's seat and the front seat has touched a touch panel.

Solution to Problem

An input control device according to the present disclosure includes: processing circuitry to acquire touch information from a touch panel; to calculate an angle of a touched area on an operation surface of the touch panel on the basis of the touch information acquired; to estimate the direction of an operator who has touched the touch panel, on the basis of both the calculated angle of the touched area, and at least one angle threshold; to acquire detection information from a sensor to detect a part of the operator's body; to estimate a relative position of the part of the operator's body with respect to the touch panel on the basis of the detection information acquired; and to correct the angle threshold on the basis of the estimated relative position of the part of the operator's body with respect to the touch panel.

Advantageous Effects of Invention

According to the present disclosure, which one of occupants sitting in the driver's seat and the front seat has touched the touch panel can be determined with a high degree of accuracy.

BRIEF DESCRIPTION OF DRAWINGS

FIG. 9A is a figure showing an example of a left side angle threshold set for each split area in an input control device according to Embodiment 4, and FIG. 9B is a figure showing an example of a right side angle threshold set for each split area in the input control device according to Embodiment 4.

DESCRIPTION OF EMBODIMENTS

Hereinafter, embodiments of the present disclosure will be explained in detail with reference to the drawings.

Embodiment 1

An input control device 1 according to Embodiment 1 will be explained hereinafter, assuming, as an example, a case in which the input control device is applied to a display system 2.

Figure 1:
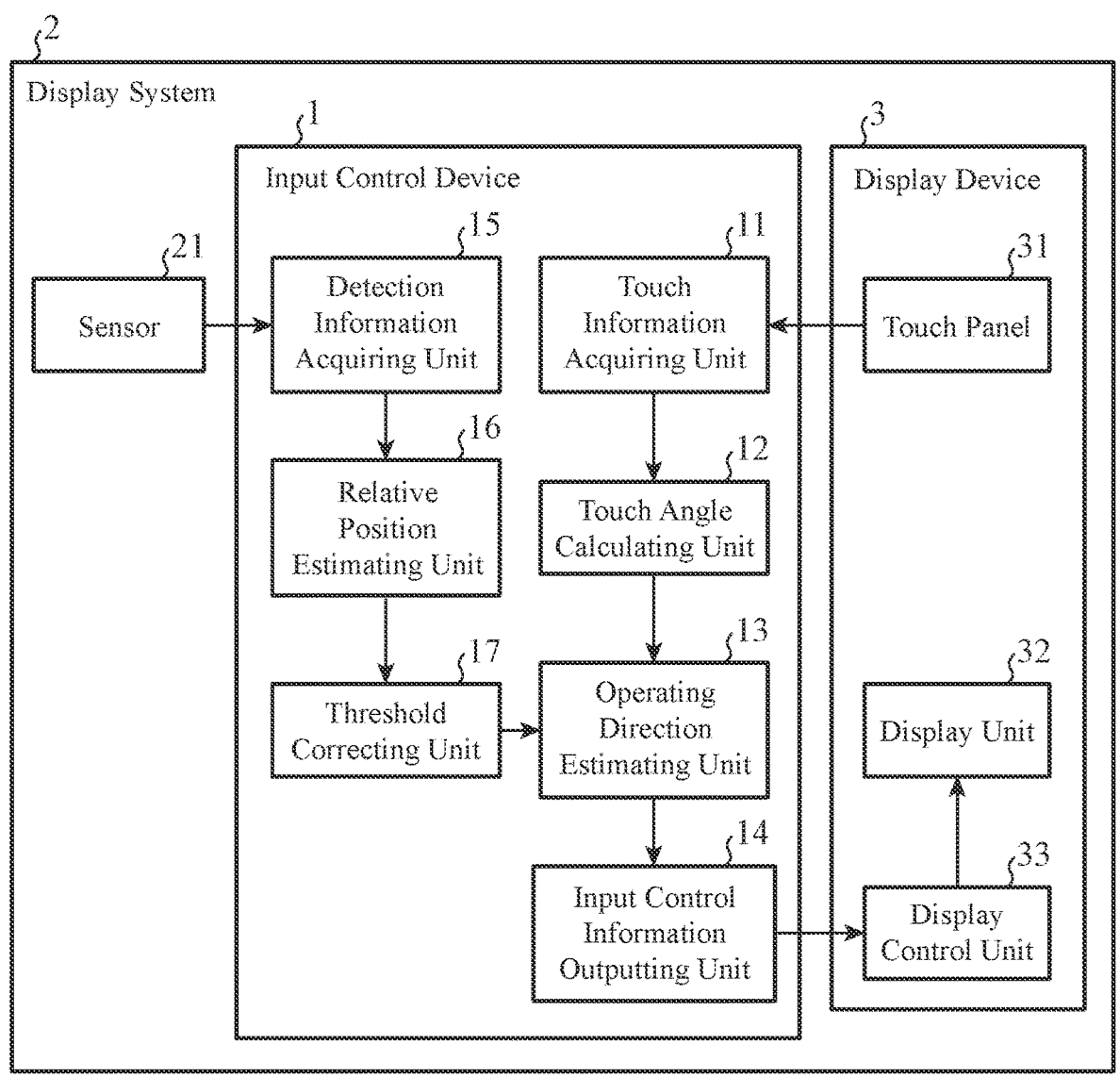
FIG. 1 is a block diagram showing the configuration of a display device to which an input control device according to Embodiment 1 is applied.

FIG. 1 is a block diagram showing the configuration of the display system 2 to which the input control device 1 according to Embodiment 1 is applied. The display system 2 includes the input control device 1, a display device 3, and a sensor 21.

The display device 3 includes a display control unit 33, a touch panel 31, and a display unit 32.

For example, in a case in which the display device 3 functions as a part of a navigation system, the display control unit 33 provides guidance on a route to a destination by using a global positioning system (GPS) or the like, and displays an image of both a map and the route guidance on the display unit 32. For example, the display control unit 33 changes the image of both the map and the route guidance, the image being displayed on the display unit 32, on the basis of input control information which is outputted by the input control device 1 and which will be mentioned later.

The touch panel 31 is constituted by a transparent member and is provided on the display unit 32, so that the touch panel acts as an operation input means for making it possible to virtually operate the image displayed on the display unit 32.

The input control device 1 includes a touch information acquiring unit 11, a touch angle calculating unit 12, an operating direction estimating unit 13, an input control information outputting unit 14, a detection information acquiring unit 15, a relative position estimating unit 16, and a threshold correcting unit 17.

The touch information acquiring unit 11 acquires touch information from the touch panel 31.

The touch panel 31 includes, for example, a touch sensor constituted by sensors such as multiple electrostatic capacitive sensors arranged in a matrix. When an operation surface of the touch panel 31 is touched by an operator's fingertip or the like, the touch panel 31 determines whether or not each of the multiple sensors arranged in a matrix is touched, and outputs, as touch information, information about an area which includes sensors determined to be touched. The touch information acquiring unit 11 acquires the touch information including the information about the area which is determined to be touched using the sensors (referred to as a "touched area" hereinafter) from the touch panel 31.

The touch angle calculating unit 12 calculates an angle of the touched area on the operation surface of the touch panel 31 on the basis of the touch information acquired by the touch information acquiring unit 11. The angle of the touched area calculated by the touch angle calculating unit 12 is a relative angle with respect to a predetermined direction on the operation surface of the touch panel 31. A method of, in the touch angle calculating unit 12, calculating the angle of the touched area will be mentioned later.

The operating direction estimating unit 13 estimates a direction of the operator who has touched the touch panel, on the basis of both the angle of the touched area calculated by the touch angle calculating unit 12, and an angle threshold.

The angle threshold is a relative angle with respect to the above-mentioned predetermined direction on the operation surface of the touch panel 31. The angle threshold has a value that is predetermined before the operating direction estimating unit 13 estimates the direction in which the operator who has touched the touch panel is present. The details of the angle threshold will be mentioned later. The operating direction estimating unit 13 estimates the direction of the operator who has touched the touch panel by comparing the angle of the touched area with the angle threshold.

On the basis of both information about the direction of the operator who has touched the touch panel, the direction being estimated by the operating direction estimating unit 13, and the touch information acquired by the touch information acquiring unit 11, the input control information outputting unit 14 generates input control information and performs a process of outputting the input control information.

The sensor 21 detects a part of an operator's body. A part of an operator's body which the sensor 21 detects is a part of the body of each of operators who can operate the touch panel 31. For example, in the case in which the touch panel 31 is provided between the driver's seat and the front seat, a part of an operator's body which the sensor 21 detects is a part of the body of each of occupants sitting in the driver's seat and the front seat.

The sensor 21 is, for example, a camera provided inside the vehicle, for capturing an image of occupants inside the vehicle.

The detection information acquiring unit 15 acquires detection information from the sensor 21 that detects a part of an operator's body.

The detection information acquired by the detection information acquiring unit 15 is about a part of the body of each of operators who can operate the touch panel 31, the part being detected by the sensor 21, as mentioned above.

In the case in which the sensor 21 is a camera, the detection information acquiring unit 15 acquires image data from the camera. Although the case in which the sensor 21 that detects a part of an operator's body is a camera is explained in this embodiment, no limitation to the case is intended, and the camera can be replaced by a sensor 21 that can detect the shape of an object and the distance to the object, such as an ultrasonic sensor.

The relative position estimating unit 16 estimates a relative position of a part of an operator's body with respect to the touch panel 31 on the basis of the detection information acquired by the detection information acquiring unit 15.

In the case in which the sensor 21 is a camera, the relative position estimating unit 16 analyzes the image data acquired by the detection information acquiring unit 15 by using a well-known image analysis technique, to estimate a relative position of a part of the body of each of operators who can operate the touch panel 31 with respect to the position of the camera. The relative position estimating unit 16 estimates the relative position of a part of the body of each of operators who can operate the touch panel 31 with respect to the touch panel 31 from both the relative position of a part of the body of the corresponding operator who can operate the touch panel 31 with respect to the position of the camera, and a relative position of the touch panel 31 that is preset with respect to the position of the camera in the same manner. The sensor 21 may be provided in the display device 3 or the input control device 1.

The threshold correcting unit 17 corrects the angle threshold for each operator who can operate the touch panel 31 on the basis of the relative position of a part of the body of the operator who can operate the touch panel 31 with respect to the touch panel 31, the relative position being estimated by the relative position estimating unit 16. A method of, in the threshold correcting unit 17, correcting the angle threshold will be mentioned later.

In the display device 3 configured in this way, when the input control information outputted from the input control device 1 indicates an operator's operation that is prohibited, the display control unit 33 can disable this operation, for example.

FIG. 2 is a diagram showing examples of the hardware configuration of the input control device 1 according to Embodiment 1.

In Embodiment 1, each of the functions of the touch information acquiring unit 11, the touch angle calculating unit 12, the operating direction estimating unit 13, the input control information outputting unit 14, the detection information acquiring unit 15, the relative position estimating unit 16, and the threshold correcting unit 17 is implemented by a processing circuit 201. More specifically, a processing circuit 201 for outputting the input control information generated by the input control information outputting unit 14 on the basis of both the touch information acquired by the touch information acquiring unit 11 and the detection information acquired by the detection information acquiring unit 15 is included.

Figure 2A:
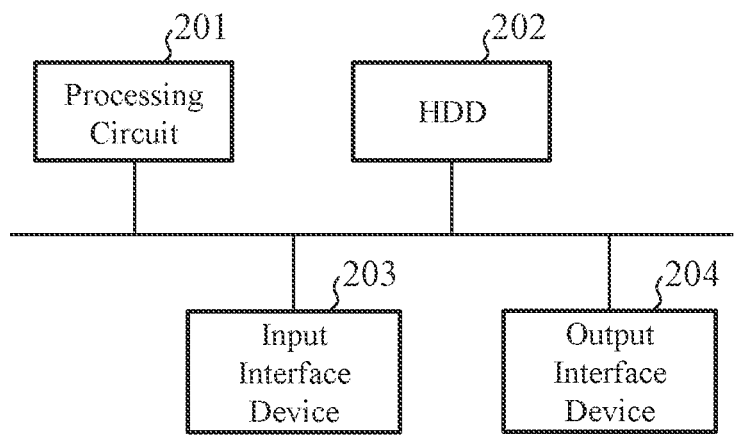
FIGS. 2A and 2B are diagrams showing examples of the hardware configuration of the input control device according to Embodiment 1.
Figure 2B:
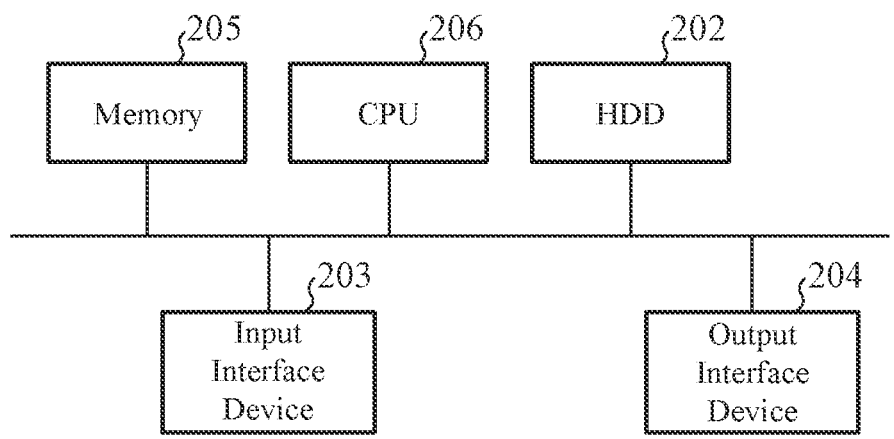

The processing circuit 201 may be hardware for exclusive use as shown in FIG. 2A or a central processing unit (CPU) 206, as shown in FIG. 2B, which executes a program stored in a memory 205.

In the case in which the processing circuit 201 is hardware for exclusive use, the processing circuit 201 is, for example, a single circuit, a composite circuit, a programmable processor, a parallel programmable processor, an application specific integrated circuit (ASIC), a field-programmable gate array (FPGA), or a combination thereof.

In the case in which the processing circuit 201 is the CPU 206, each of procedures of the touch information acquiring unit 11, the touch angle calculating unit 12, the operating direction estimating unit 13, the input control information outputting unit 14, the detection information acquiring unit 15, the relative position estimating unit 16, and the threshold correcting unit 17 is implemented by software, firmware, or a combination of software and firmware. More specifically, the touch information acquiring unit 11, the touch angle calculating unit 12, the operating direction estimating unit 13, the input control information outputting unit 14, the detection information acquiring unit 15, the relative position estimating unit 16, and the threshold correcting unit 17 are implemented by either the CPU 206 that executes a program stored in a hard disk drive (HDD) 202, the memory 205, or the like, or a processing circuit such as a system large-scale integration (LSI). Further, it can be said that the program stored in the HDD 202, the memory 205, or the like causes a computer to perform the procedures of the touch information acquiring unit 11, the touch angle calculating unit 12, the operating direction estimating unit 13, the input control information outputting unit 14, the detection information acquiring unit 15, the relative position estimating unit 16, and the threshold correcting unit 17, i.e., the touch information acquiring procedure, the touch angle calculating procedure, the operating direction estimating procedure, the input control information outputting procedure, the detection information acquiring procedure, the relative position estimating procedure, and the threshold correcting procedure. Here, the memory 205 is, for example, a non-volatile or volatile semiconductor memory, such as a random access memory (RAM), a read only memory (ROM), a flash memory, an erasable programmable read only memory (EPROM), and an electrically erasable programmable read-only memory (EEPROM), a magnetic disc, a flexible disc, an optical disc, a compact disc, a mini disc, or a digital versatile disc (DVD).

A part of the functions of the touch information acquiring unit 11, the touch angle calculating unit 12, the operating direction estimating unit 13, the input control information outputting unit 14, the detection information acquiring unit 15, the relative position estimating unit 16, and the threshold correcting unit 17 may be implemented by hardware for exclusive use, and another part of the functions may be implemented by software or firmware. For example, the functions of the touch information acquiring unit 11, the touch angle calculating unit 12, the detection information acquiring unit 15, and the relative position estimating unit 16 can be implemented by the processing circuit 201 as hardware for exclusive use, and the functions of the operating direction estimating unit 13, the input control information outputting unit 14, and the threshold correcting unit 17 can be implemented by a processing circuit's reading and executing the program stored in the memory 205.

Further, the input control device 1 has an input interface device 203 and an output interface device 204 for performing communications with the touch panel 31, the sensor 21, the display control unit 33, and so on.

Although in the above explanation the hardware configuration of the input control device 1 is explained assuming that the HDD 202 is used as shown in FIG. 2B, a solid state drive (SSD) may be used instead of the HDD 202.

The method of, in the touch angle calculating unit 12, calculating the angle of the touched area will be explained.

Figure 3:
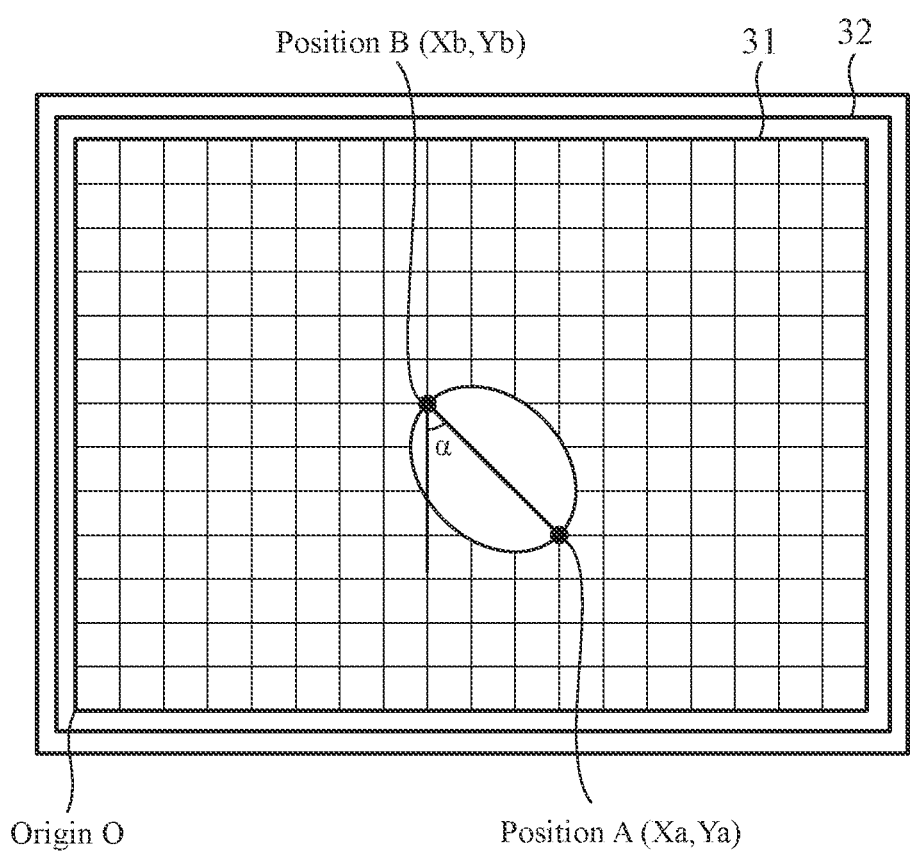
FIG. 3 is a schematic view of an example of a touched area included in touch information in the input control device according to Embodiment 1.

FIG. 3 is a schematic view of an example of the touched area included in the touch information in the input control device 1 according to Embodiment 1.

FIG. 3 shows, for example, the touched area touched by an operator located on a right-hand side of the touch panel 31 while facing the operation surface of the touch panel 31.

On the operation surface of the touch panel 31, plane coordinates in which the lower left corner of the operation surface of the touch panel 31 is defined as a reference point, i.e., the origin O are set up. A right-left direction in FIG. 3 is defined as the X direction, and an up-down direction is defined as the Y direction. In the X direction, the direction extending rightward in FIG. 3 is defined as the positive direction and the direction extending leftward in FIG. 3 is defined as the negative direction. Further, in the Y direction, the direction extending upward in FIG. 3 is defined as the positive direction and the direction extending downward in FIG. 3 is defined as the negative direction. Hereinafter, a position P on the operation surface of the touch panel 31 is expressed by plane coordinates (Xp, Yp) in the X direction and in the Y direction.

The touch angle calculating unit 12 regards the touched area as an ellipse, for example. The touch angle calculating unit 12 defines, out of the positions of the two ends on the major axis of the touched area regarded as the ellipse, the position of the end having a smaller Y coordinate value as the position A and the position of the other end as the position B, and then calculates the angle of the touched area. Although in this Embodiment the example of regarding the touched area as an ellipse and defining the two ends on the major axis of the ellipse as the positions A and B is explained, the method of determining the positions A and B is not limited to this example as long as the touch angle calculating unit 12 can calculate the angle of the touched area. For example, the positions A and B may be two positions with the longest distance therebetween in the touched area.

The angle of the touched area which is calculated by the touch angle calculating unit 12 is a relative angle which a straight line passing through the positions A and B forms with respect to the negative direction of the Y direction on the operation surface of the touch panel 31, the negative direction being defined as a reference direction. In FIG. 3, the angle α of the touched area is determined from the following mathematical expression. α is a principal value.

$$\alpha = \sin^{-1} \frac{(Xa - Xb)}{\sqrt{\{(Xa - Xb)^2 + (Ya - Yb)^2\}}}$$

The operating direction estimating unit 13 estimates the direction of the operator who has touched the touch panel on the basis of the angle α and the angle threshold.

Hereinafter, an explanation will be made by taking, as an example, a case in which the touch panel 31 is provided at a predetermined level between the driver's seat and the front seat. The predetermined level is, for example, a pre-assumed level of the shoulders of a typical operator.

A case in which, for example, an operator located on a right-hand side of the touch panel 31 while facing the operation surface of the touch panel 31 touches the touch panel 31 on such a condition will be considered. A finger with which the operator located on a right-hand side of the touch panel 31 while facing the operation surface of the touch panel 31 touches the touch panel 31 is in a state in which the finger is extending from lower right toward upper left with respect to the operation surface of the touch panel 31. Therefore, the touched area also has a shape extending from lower right toward upper left with respect to the operation surface of the touch panel 31, and thus the angle of the touched area has a positive value. Therefore, the angle threshold (referred to as a "right side angle threshold" hereinafter) before the threshold correcting unit 17 corrects the angle threshold, the right side angle threshold being used for the operating direction estimating unit 13 to estimate that the direction in which the operator who has touched the touch panel is present is on the right-hand side of the touch panel 31 when facing the operation surface of the touch panel 31, has a positive value. In addition, taking into consideration the state in which the finger with which the operator touches the operation surface of the touch panel 31 is extending from lower right toward upper left with respect to the operation surface of the touch panel 31, the right side angle threshold has, for example, a value range from 30 degrees to 45 degrees. When the angle α is within the range of the right side angle threshold, the operating direction estimating unit 13 determines that the direction in which the operator who has touched the touch panel is present is on the right-hand side of the touch panel 31 when facing the operation surface of the touch panel 31.

In contrast, the angle threshold (referred to as a "left side angle threshold" hereinafter) before the threshold correcting unit 17 corrects the angle threshold, the left side angle threshold being used for the operating direction estimating unit 13 to estimate that the direction in which the operator who has touched the touch panel is present is on the left-hand side of the touch panel 31 when facing the operation surface of the touch panel 31, has, for example, a value range from minus (expressed as "−" hereinafter) 45 degrees to −30 degrees. When the angle α is within the range of the left side angle threshold, the operating direction estimating unit 13 determines that the direction in which the operator who has touched the touch panel is present is on the left-hand side of the touch panel 31 when facing the operation surface of the touch panel 31.

The threshold correcting unit 17 corrects the above-mentioned angle threshold on the basis of the relative position of a part of the operator's body with respect to the touch panel 31, the relative position being estimated by the relative position estimating unit 16.

The part of the operator's body is, for example, a shoulder of each of operators who can operate the operation surface of the touch panel 31. The part of the operator's body is not limited to a shoulder of the operator, and may be the face, an elbow, or the like of the operator. Hereinafter, a case in which the angle threshold before the threshold correcting unit 17 corrects the angle threshold has a value that is preset on the assumption that, for example, the level of the touch panel 31 is the same as that of the operator's shoulder will be explained as an example.

When the relative position estimating unit 16 estimates that the level of the operator's shoulder is higher than that of the touch panel 31 by 10 cm, the touch panel 31 is positioned relatively lower than an assumed level. In the case in which the level of the touch panel 31 is relatively lower than the assumed level, the direction in which the finger with which the operator touches the operation surface of the touch panel 31 is extending gets closer to a horizontal direction as compared with the case in which the level of the touch panel 31 is the assumed level. More specifically, in the case in which the level of the touch panel 31 is relatively lower than the assumed level, the angle of the finger with which the operator touches the operation surface of the touch panel 31 has a larger absolute value as compared with the case in which the level of the touch panel 31 is the assumed level. Therefore, in the case in which the level of the touch panel 31 is relatively lower than the assumed level, the threshold correcting unit 17 corrects the angle threshold by, for example, multiplying by 1.5 for each of the lower and upper limits of the angle threshold which is set before the threshold correcting unit 17 corrects the angle threshold. Further, for example, when the relative position estimating unit 16 estimates that the level of the operator's shoulder is higher than that of the touch panel 31 by 20 cm, the threshold correcting unit 17 corrects the angle threshold by, for example, multiplying by 2.0 for each of the lower and upper limits of the angle threshold which is set before the threshold correcting unit 17 corrects the angle threshold. In contrast, when the relative position estimating unit 16 estimates that the level of the operator's shoulder is lower than that of the touch panel 31, the threshold correcting unit 17 corrects the angle threshold by, for example, multiplying by a value smaller than 1.0 depending on the relative position in the level direction for each of the lower and upper limits of the angle threshold which is set before the threshold correcting unit 17 corrects the angle threshold.

Although the configuration in which the threshold correcting unit 17 corrects the angle threshold on the basis of the relative level of a part of the operator's body with respect to the touch panel 31 is explained above, the criterion for correcting the angle threshold in the threshold correcting unit 17 is not limited to the one based on the relative level of a part of the operator's body with respect to the touch panel 31.

For example, the correction may be made on the basis of the distance, in a direction perpendicular to the operation surface of the touch panel 31, between the operation surface of the touch panel 31 and a part of the operator's body. For example, in a case in which the distance, in a direction perpendicular to the operation surface of the touch panel 31, between the operation surface of the touch panel 31 and the operator's shoulder is shorter than a pre-assumed distance, the direction in which the finger with which the operator touches the operation surface of the touch panel 31 is extending gets closer to a vertical direction. More specifically, in the case in which the distance, in a direction perpendicular to the operation surface of the touch panel 31, between the operation surface of the touch panel 31 and the operator's shoulder is shorter than the pre-assumed distance, the angle of the finger with which the operator touches the operation surface of the touch panel 31 has a smaller absolute value. Therefore, in the case in which the distance, in a direction perpendicular to the operation surface of the touch panel 31, between the operation surface of the touch panel 31 and the operator's shoulder is shorter than the pre-assumed distance, the threshold correcting unit 17 corrects the angle threshold by, for example, multiplying by a value smaller than 1.0 depending on the distance for each of the lower and upper limits of the angle threshold which is set before the threshold correcting unit 17 corrects the angle threshold. In contrast, for example, in a case in which the distance, in a direction perpendicular to the operation surface of the touch panel 31, between the operation surface of the touch panel 31 and the operator's shoulder is longer than the pre-assumed distance, the direction in which the finger with which the operator touches the touch panel 31 is extending gets closer to a horizontal direction as compared with the case in which the distance is shorter than the pre-assumed distance. Therefore, the threshold correcting unit 17 corrects the angle threshold by, for example, multiplying by a value larger than 1.0 depending on the distance for each of the lower and upper limits of the angle threshold which is set before the threshold correcting unit 17 corrects the angle threshold.

In addition, for example, the threshold correcting unit 17 may perform the correction on the basis of the distance, in a horizontal direction parallel to the operation surface of the touch panel 31, between the touch panel 31 and a part of the operator's body.

In a case in which the distance is shorter, the direction in which the finger with which the operator touches the touch panel 31 is extending gets closer to a vertical direction, whereas in a case in which the distance is longer, the direction gets closer to a horizontal direction. Therefore, the threshold correcting unit 17 corrects the angle threshold by multiplying by a value depending on the distance for each of the lower and upper limits of the angle threshold which is set before correction of the angle threshold.

Further, although the correction of the angle threshold in accordance with the relative position of a part of the operator's body with respect to the touch panel 31 in each direction is explained previously, the correction may be made on the basis of a relative position or a distance in a combination of the above-mentioned directions.

In the technique described in Patent Literature 1, it is impossible to accurately estimate the direction in which an operator is present because the correction of the angle threshold is not made using the relative position of a part of the operator's body with respect to the touch panel 31, which is mentioned above.

The method of, in the threshold correcting unit 17, making the correction is not limited to the one of multiplying by a predetermined value depending on the relative position of a part of the operator's body with respect to the touch panel 31 for each of the lower and upper limits of the angle threshold which is set before correction of the angle threshold. For example, the threshold correcting unit 17 may multiply by a different numerical value for each of the lower and upper limits of the angle threshold which is set before correction of the angle threshold. Further, for example, the right side angle threshold and the left side angle threshold may be multiplied by different numerical values. Further, for example, the threshold correcting unit 17 may add or subtract a value to or from each of the lower and upper limits of the angle threshold which is set before correction of the angle threshold, on the basis of a predetermined method.

The operation will be explained.

Figure 4:
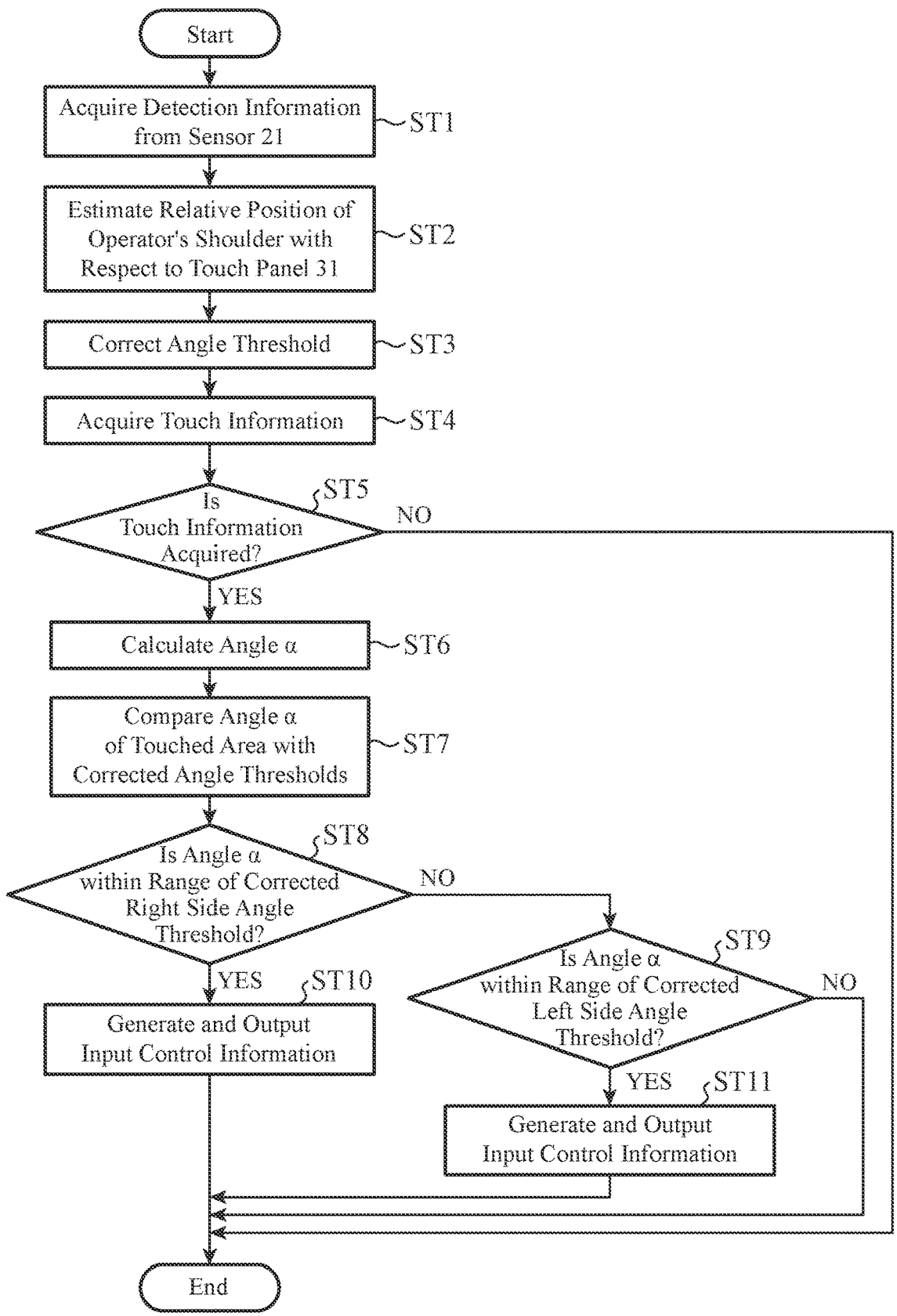
FIG. 4 is a flowchart explaining processing of the input control device according to Embodiment 1.

FIG. 4 is a flowchart for explaining processing of the input control device 1 according to Embodiment 1.

The input control device 1 repeatedly performs the processing shown in the flowchart shown in FIG. 4.

Hereinafter, the processing of the input control device according to Embodiment 1 will be explained using the flowchart.

First, the detection information acquiring unit 15 acquires detection information from the sensor 21 (step ST1).

Next, the relative position estimating unit 16 estimates the relative position of a part of an operator's body, e.g., an operator's shoulder with respect to the touch panel 31 on the basis of the detection information, as mentioned above (step ST2).

Next, the threshold correcting unit 17 corrects the angle threshold on the basis of the relative position, as mentioned above (step ST3).

Next, the touch information acquiring unit 11 acquires touch information from the touch panel 31 (step ST4).

When the touch information acquiring unit 11 does not acquire touch information from the touch panel 31 (NO in step ST5), the input control device 1 ends the processing.

When the touch information acquiring unit 11 acquires touch information from the touch panel 31 (YES in step ST5), the touch angle calculating unit 12 calculates the angle $\alpha$ of the touched area on the basis of the touch information, as mentioned above (step ST6).

Next, the operating direction estimating unit 13 compares the angle $\alpha$ of the touched area with the corrected angle thresholds, as mentioned above (step ST7).

When the angle $\alpha$ of the touched area is within the range of the corrected right side angle threshold (YES in step ST8), the input control information outputting unit 14 generates input control information on the basis of both information indicating that the direction of the operator who has touched the touch panel is a right side one and the touch information, and performs a process of outputting the input control information (step ST10), and the input control device 1 ends the processing.

When the angle $\alpha$ of the touched area is not within the range of the corrected right side angle threshold (NO in step ST8), but the angle $\alpha$ of the touched area is within the range of the corrected left side angle threshold (YES in step ST9), the input control information outputting unit 14 generates input control information on the basis of both information indicating that the direction of the operator who has touched the touch panel is a left side one and the touch information, and performs a process of outputting the input control information (step ST11), and the input control device 1 ends the processing.

When the angle $\alpha$ of the touched area is not within the range of the corrected left side angle threshold (NO in step ST9), the input control device 1 ends the processing.

What is necessary is just to complete the processes of steps ST3 and ST6 before the process of step ST7, and thus the order of the processes in the processing of the input control device 1 is not limited to that shown in FIG. 4.

As mentioned above, the input control device 1 includes: the touch information acquiring unit 11 for acquiring touch information from the touch panel 31; the touch angle calculating unit 12 for calculating the angle of a touched area on the operation surface of the touch panel 31 on the basis of the touch information acquired by the touch information acquiring unit 11; the operating direction estimating unit 13 for estimating the direction of an operator who has touched the touch panel, on the basis of both the angle of the touched area, the angle being calculated by the touch angle calculating unit 12, and the angle threshold; the detection information acquiring unit 15 for acquiring detection information from the sensor 21 for detecting a part of the operator's body; the relative position estimating unit 16 for estimating a relative position of the part of the operator's body with respect to the touch panel 31 on the basis of the detection information acquired by the detection information acquiring unit 15; and the threshold correcting unit 17 for correcting the angle threshold on the basis of the relative position of the part of the operator's body with respect to the touch panel 31, the relative position being estimated by the relative position estimating unit 16.

With the configuration as described above, the input control device 1 can accurately determine which occupant out of occupants sitting in the driver's seat and the front seat has touched the touch panel 31.

Embodiment 2

An input control device 1 according to Embodiment 2 will be explained hereinafter, assuming, as an example, a case in which the input control device is applied to a display system 2.

Figure 5:
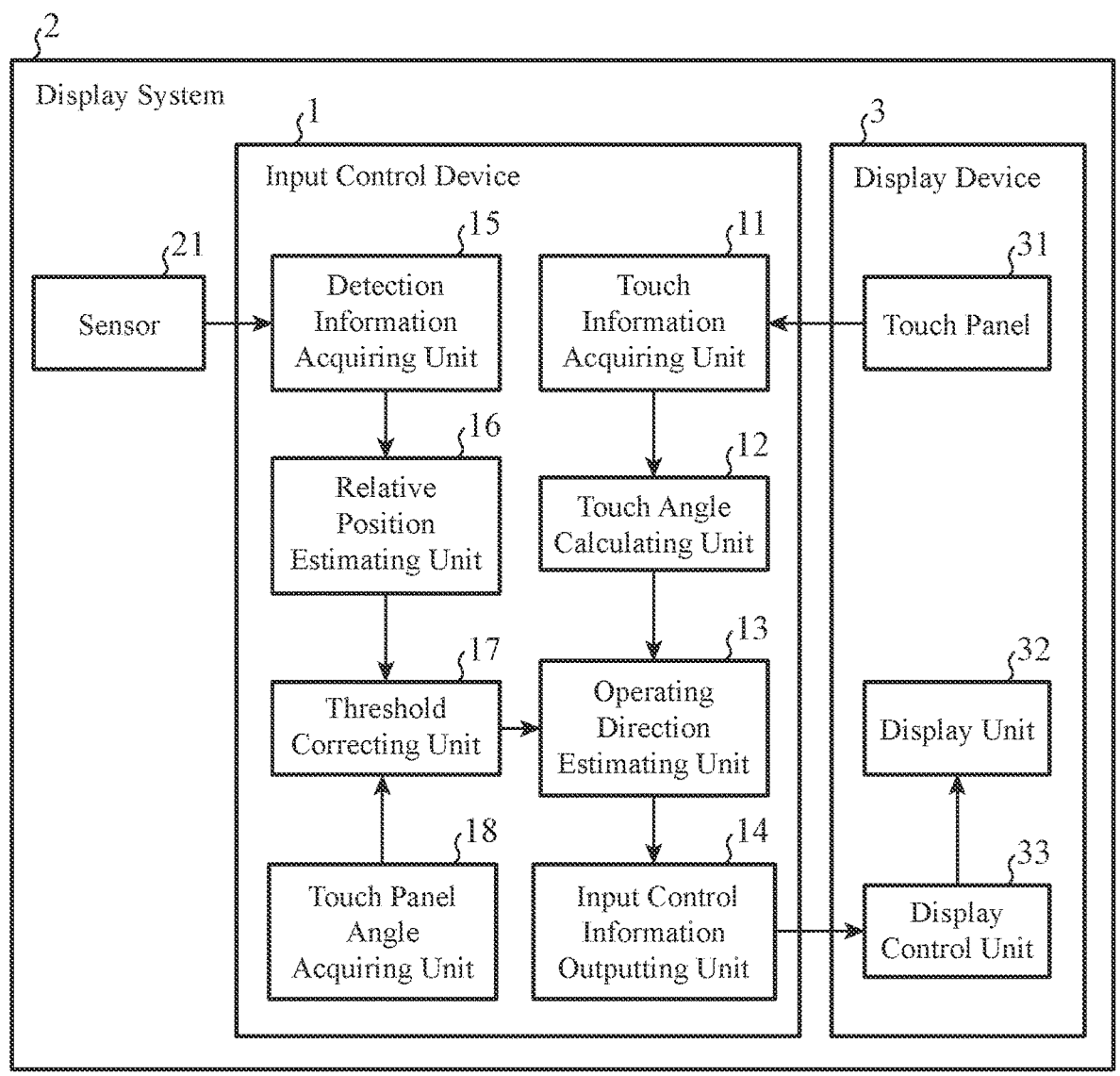
FIG. 5 is a block diagram showing the configuration of a display device to which an input control device according to Embodiment 2 is applied.

FIG. 5 is a block diagram showing the configuration of the display system 2 to which the input control device 1 according to Embodiment 2 is applied.

The difference between the input control device 1 according to Embodiment 1 shown in FIG. 1 and the input control device 1 according to Embodiment 2 shown in FIG. 5 is that the input control device 1 according to Embodiment 2 includes a touch panel angle acquiring unit 18 in addition to the configuration of the input control device 1 according to Embodiment 1.

The other components that are the same as those of Embodiment 1 are denoted by the same reference signs, and a repetitive explanation of the components will be omitted hereinafter.

The touch panel angle acquiring unit 18 acquires a direction in which an operation surface of a touch panel 31 is directed.

A method of acquiring the direction in which the operation surface of the touch panel 31 is directed is, for example, one of acquiring the direction by reading a preset value. Further, in a case in which a direction in which the touch panel 31 is directed changes as a direction in which a display unit 32 of a display device 3 is directed changes, the direction in which the operation surface of the touch panel 31 is directed may be acquired by acquiring the direction in which the display unit 32 is directed from the display device 3.

A threshold correcting unit 17 changes a correction coefficient used in correcting an angle threshold, in accordance with the direction in which the operation surface of the touch panel 31 is directed, the direction being acquired by the touch panel angle acquiring unit 18.

The correction coefficient is, for example, a coefficient by which the angle threshold is multiplied when the angle threshold is corrected. The correction coefficient is not necessarily multiplied on the angle threshold, and the correction coefficient may be added or subtracted to or from the angle threshold.

Changing the correction coefficient in accordance with the direction in which the operation surface of the touch panel 31 is directed means that, for example, in a case in which the original angle threshold has a value which is preset on the assumption that the direction in which the operation surface of the touch panel 31 is directed is horizontal, the correction coefficient is changed in accordance with an angle, toward an upward or downward direction, which the direction in which the operation surface of the touch panel 31 is directed forms with respect to a horizontal direction.

For example, in a case in which the direction in which the operation surface of the touch panel 31 is directed is downward with respect to a horizontal direction, a direction in which a finger with which an operator touches the operation surface of the touch panel 31 is extending gets closer to a horizontal direction. Therefore, in the case in which the direction in which the operation surface of the touch panel 31 is directed is downward with respect to a horizontal direction, an angle of a touched area has a larger absolute value as compared with the case in which the direction in which the operation surface of the touch panel 31 is directed is horizontal. Therefore, the threshold correcting unit 17 changes the correction coefficient used in correcting the angle threshold in such a way that the corrected angle threshold becomes large, in accordance with the direction in which the operation surface of the touch panel 31 is directed, the direction being acquired by the touch panel angle acquiring unit 18.

In contrast, in a case in which the direction in which the operation surface of the touch panel 31 is directed is upward with respect to a horizontal direction, a direction in which a finger with which an operator touches the operation surface of the touch panel 31 is extending gets closer to a vertical direction. Therefore, in the case in which the direction in which the operation surface of the touch panel 31 is directed is upward with respect to a horizontal direction, the angle of the touched area has a smaller absolute value as compared with the case in which the direction in which the operation surface of the touch panel 31 is directed is horizontal. Therefore, the threshold correcting unit 17 changes the correction coefficient used in correcting the angle threshold in such a way that the corrected angle threshold becomes small, in accordance with the direction in which the operation surface of the touch panel 31 is directed, the direction being acquired by the touch panel angle acquiring unit 18.

Further, in a case in which, for example, the direction in which the operation surface of the touch panel 31 is directed turns horizontally with respect to a reference direction, concretely, in a case in which the direction in which the operation surface of the touch panel 31 is directed turns toward the direction of an operator on either a right side or a left side, the threshold correcting unit 17 may change the correction coefficient in accordance with the direction in which the operation surface of the touch panel 31 is directed.

For example, in a case in which the direction in which the operation surface of the touch panel 31 is directed turns toward the direction of an operator, and thereby becomes a direction more directly facing the operator compared with the original direction, the direction in which a finger with which the operator touches the operation surface of the touch panel 31 is extending gets closer to a vertical direction. In contrast, in a case in which the direction in which the operation surface of the touch panel 31 is directed turns toward a direction opposite to the direction of an operator, and thereby becomes a direction less directly facing the operator compared with the original direction, the direction in which a finger with which the operator touches the operation surface of the touch panel 31 is extending gets closer to a horizontal direction. Therefore, also in the case in which the direction in which the operation surface of the touch panel 31 is directed turns horizontally with respect to the reference direction, the threshold correcting unit 17 changes the correction coefficient used in correcting the angle threshold, in accordance with the direction in which the operation surface of the touch panel 31 is directed, the direction being acquired by the touch panel angle acquiring unit 18, like in the case of changing the correction coefficient in accordance with an angle, toward an upward or downward direction, which the direction in which the operation surface of the touch panel 31 is directed forms with respect to a horizontal direction.

Further, although the configuration in which the threshold correcting unit 17 changes the correction coefficient used in correcting the angle threshold, in accordance with each direction in which the operation surface of the touch panel 31 is directed, the direction being acquired by the touch panel angle acquiring unit 18, is explained, the threshold correcting unit 17 may change the correction coefficient used in correcting the angle threshold, in accordance with a combination of directions in each of which the operation surface of the touch panel 31 is directed.

In Embodiment 2, the functions of the touch panel angle acquiring unit 18 and the threshold correcting unit 17 are implemented by a processing circuit 201 in the hardware configuration whose examples are shown in FIGS. 2A and 2B in Embodiment 1, like in the case of Embodiment 1.

The operation will be explained.

Figure 6:
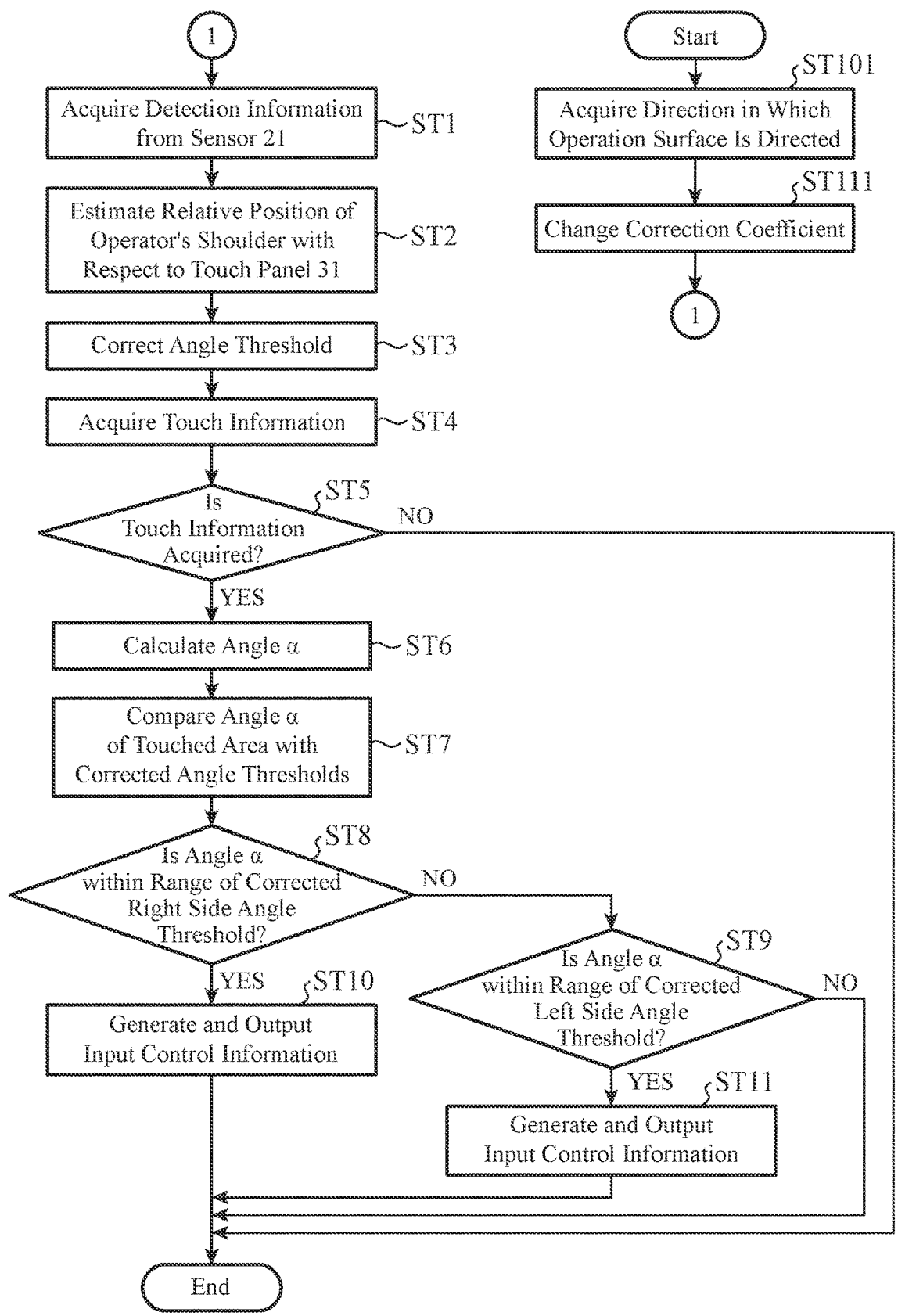
FIG. 6 is a flowchart explaining processing of the input control device according to Embodiment 2.

FIG. 6 is a flowchart for explaining processing of the input control device 1 according to Embodiment 2.

The input control device 1 repeatedly performs the processing shown in the flowchart shown in FIG. 6.

Hereinafter, the processing of the input control device according to Embodiment 2 will be explained using the flowchart.

First, the touch panel angle acquiring unit 18 acquires the direction in which the operation surface of the touch panel 31 is directed (step ST101).

Next, the threshold correcting unit 17 changes the correction coefficient in accordance with the direction in which the operation surface of the touch panel 31 is directed, as mentioned above (step ST111).

Because subsequent processes of the input control device 1 are the same as those of the input control device 1 according to Embodiment 1 shown in FIG. 4, an explanation of the processes will be omitted hereinafter.

What is necessary is just to complete the process of step ST111 before the process of step ST3, and thus the order of the processes in the processing of the input control device 1 is not limited to that shown in FIG. 6.

With the configuration as described above, the input control device 1 can more accurately determine which occupant out of occupants sitting in the driver's seat and the front seat has touched the touch panel 31 in comparison with the input control device 1 according to Embodiment 1.

Embodiment 3

An input control device 1 according to Embodiment 3 will be explained hereinafter, assuming, as an example, a case in which the input control device is applied to a display system 2.

Figure 7:
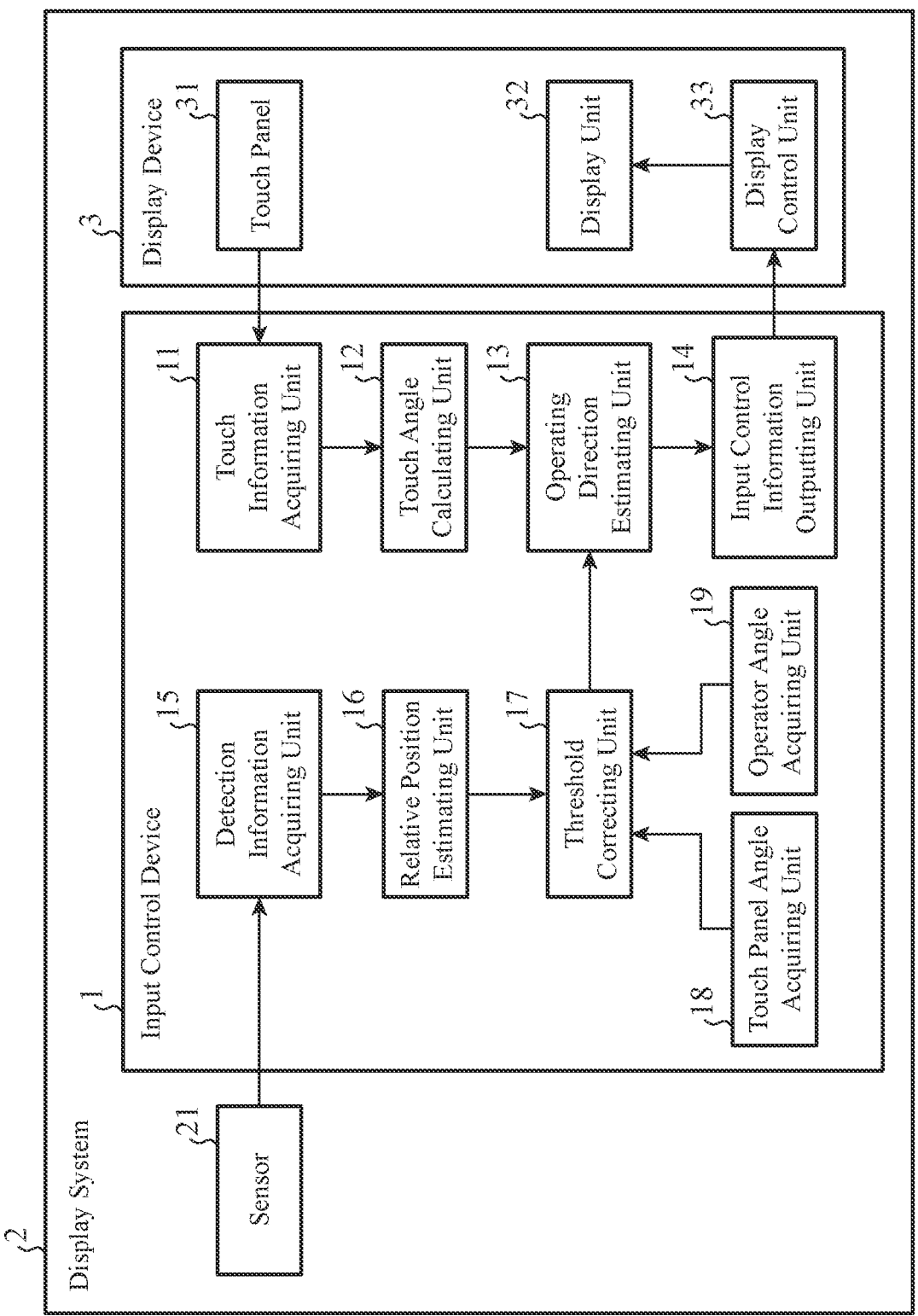
FIG. 7 is a block diagram showing the configuration of a display device to which an input control device according to Embodiment 3 is applied.

FIG. 7 is a block diagram showing the configuration of the display system 2 to which the input control device 1 according to Embodiment 3 is applied.

The difference between the input control device 1 according to Embodiment 2 shown in FIG. 5 and the input control device 1 according to Embodiment 3 shown in FIG. 7 is that the input control device 1 according to Embodiment 3 includes an operator angle acquiring unit 19 in addition to the configuration of the input control device 1 according to Embodiment 2.

The other components that are the same as those of Embodiment 2 are denoted by the same reference signs, and a repetitive explanation of the components will be omitted hereinafter.

The operator angle acquiring unit 19 acquires the direction in which an operator's body is directed.

As a method of acquiring the direction in which an operator's body is directed, for example, a known technique of estimating an occupant's posture by using a vehicle-mounted camera for capturing an image of the inside of a vehicle, load sensors arranged in the seat and backrest parts of the seats, and so on is used.

A threshold correcting unit 17 changes a correction coefficient used in correcting an angle threshold, in accordance with both the direction in which an operation surface of a touch panel 31 is directed, the direction being acquired by a touch panel angle acquiring unit 18, and the direction in which an operator's body is directed, the direction being acquired by the operator angle acquiring unit 19. Changing the correction coefficient in accordance with both the direction in which the operation surface of the touch panel 31 is directed and the direction in which an operator's body is directed means that the correction coefficient is changed in accordance with a relative angle which the direction in which the operation surface of the touch panel 31 is directed forms with respect to the direction in which an operator's body is directed.

A method of changing the correction coefficient in accordance with the relative angle which the direction in which the operation surface of the touch panel 31 is directed forms with respect to the direction in which an operator's body is directed is the same as that in the case, as shown in Embodiment 2, in which the direction in which the operation surface of the touch panel 31 is directed turns horizontally with respect to a reference direction, assuming that the direction in which an operator's body is directed is the reference direction. Thus, an explanation of the method will be omitted hereinafter.

In Embodiment 3, the function of the operator angle acquiring unit 19 is implemented by a processing circuit 201 in the hardware configuration whose examples are shown in FIGS. 2A and 2B in Embodiment 1, like in the case of Embodiment 1.

The operation will be explained.

Figure 8:
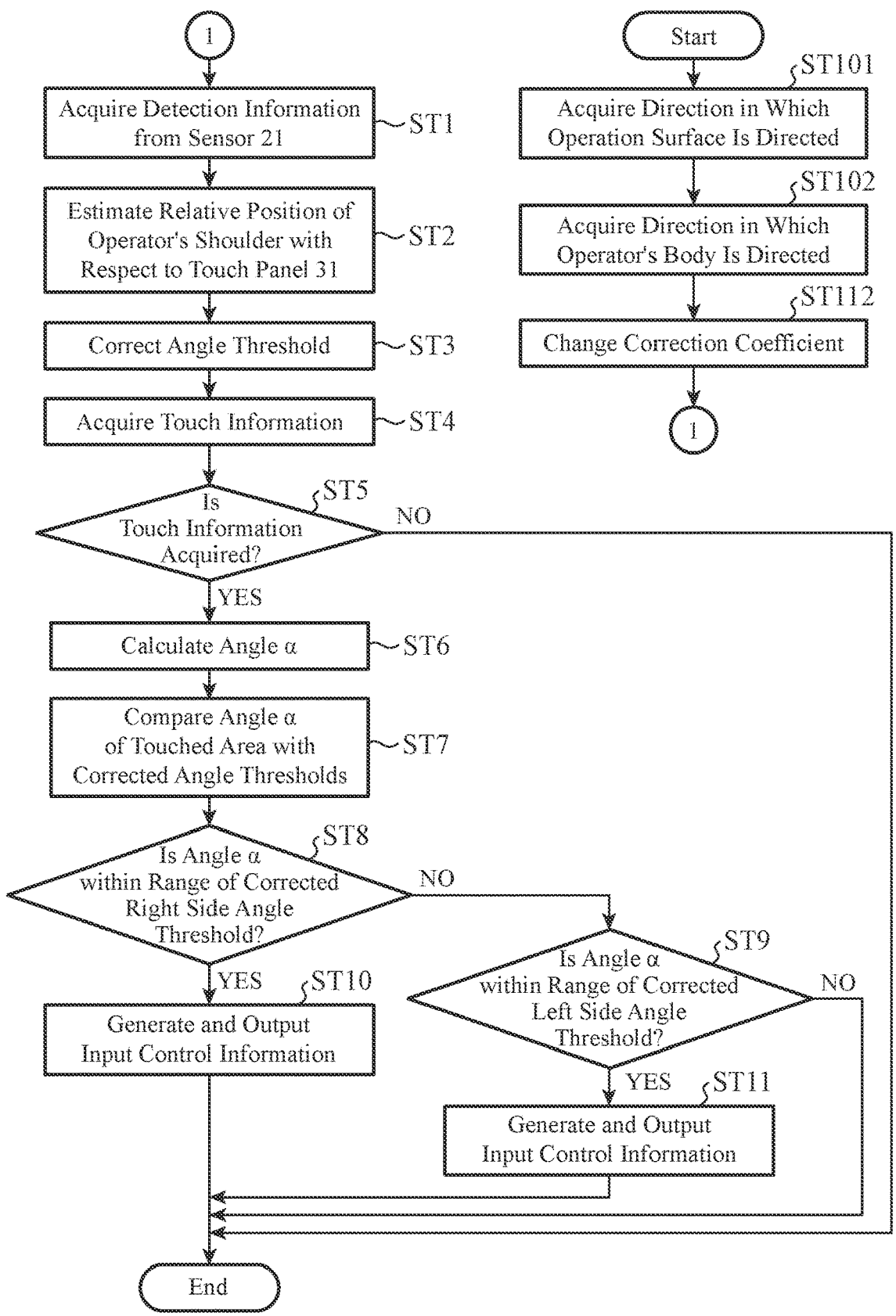
FIG. 8 is a flowchart explaining processing of the input control device according to Embodiment 3.

FIG. 8 is a flowchart for explaining processing of the input control device 1 according to Embodiment 3.

The input control device 1 repeatedly performs the processing shown in the flowchart shown in FIG. 8.

Hereinafter, the processing of the input control device 1 according to Embodiment 3 will be explained using the flowchart.

First, the touch panel angle acquiring unit 18 acquires the direction in which the operation surface of the touch panel 31 is directed (step ST101).

Next, the operator angle acquiring unit 19 acquires the direction in which an operator's body is directed (step ST102).

Next, the threshold correcting unit 17 changes the correction coefficient in accordance with both the direction in which the operation surface of the touch panel 31 is directed and the direction in which an operator's body is directed, as mentioned above (step ST112).

Because subsequent processes of the input control device 1 are the same as those of the input control device 1 according to Embodiment 2 shown in FIG. 6, an explanation of the processes will be omitted hereinafter.

What is necessary is just to complete the process of steps ST112 before the process of step ST3, and thus the order of the processes in the processing of the input control device 1 is not limited to that shown in FIG. 8.

Further, it does not matter if the order of the processes of steps ST101 and ST102 is reversed.

With the configuration as described above, the input control device 1 can more accurately determine which occupant out of occupants sitting in the driver's seat and the front seat has touched the touch panel 31 in comparison with the input control device 1 according to Embodiment 2.

Embodiment 4

An input control device 1 according to Embodiment 4 will be explained hereinafter, assuming, as an example, a case in which the input control device is applied to a display system 2.

The input control device 1 according to Embodiment 4 differs from the input control device 1 according to Embodiment 1 in that a threshold correcting unit 17 corrects an angle threshold set for each of split areas into which an operation surface of a touch panel 31 is split.

Because the other points are the same as those of Embodiment 1, a repetitive explanation of the points will be omitted hereinafter.

FIG. 9A is a figure showing an example of a left side angle threshold set for each split area.

FIG. 9A shows an example in which the operation surface of the touch panel 31 is split into three areas in a right-left direction in the figure and three areas in an up-down direction in the figure, i.e., into nine areas in total, so that the operation surface has the nine split areas.

In FIG. 9A, a left side angle threshold shown as an example in the figure is set for each split area.

For example, in FIG. 9A, the left side angle threshold for the area at the upper left corner in the figure shows that its lower limit is −25 degrees and its upper limit is −10 degrees.

FIG. 9B is a figure showing an example of a right side angle threshold set for each split area.

FIG. 9B shows an example in which the operation surface of the touch panel 31 is split into three areas in a right-left direction in the figure and three areas in an up-down direction in the figure, i.e., into nine areas in total, so that the operation surface has the nine split areas.

In FIG. 9B, a right side angle threshold shown as an example in the figure is set for each split area.

For example, in FIG. 9B, the right side angle threshold for the area at the upper left corner in the figure shows that its lower limit is 30 degrees and its upper limit is 45 degrees.

In this way, an angle threshold is set for each split area.

The threshold correcting unit 17 corrects the angle threshold that is set for each split area in this way, on the basis of a relative position of a part of an operator's body with respect to the touch panel 31, by using the method described in Embodiment 1.

An operating direction estimating unit 13 estimates the direction of an operator who has touched the touch panel on the basis of both an angle α of a touched area, and the angle threshold that is included in the angle thresholds set for the split areas and that is set for the split area corresponding to the position of the touched area on the operation surface of the touch panel 31.

When the touched area on the operation surface of the touch panel 31 extends over multiple split areas, one split area in which its part included in the touched area has the largest area, out of the multiple split areas, is determined to be the split area corresponding to the position of the touched area, for example. A method of, when the touched area on the operation surface of the touch panel 31 extends over multiple split areas, determining the split area corresponding to the position of the touched area is not limited to the above-mentioned method. For example, in a case in which the touched area is regarded as an ellipse, a split area in which the intersection of the major axis and the minor axis of the ellipse exists may be determined to be the split area corresponding to the position of the touched area. Further, for example, on the basis of the ratio, in each of the split areas, of the area of its part included in the touched area to the area of the touched area, the angle threshold may be determined using the weighted average of the angle thresholds set for the split areas.

With the configuration as described above, the input control device 1 can more accurately determine which occupant out of occupants sitting in the driver's seat and the front seat has touched the touch panel 31 in comparison with the input control device 1 according to Embodiment 1.

An input control device 1 according to a variant of Embodiment 4 will be explained.

In the input control device 1 according to Embodiment 4, the angle threshold for each split area has a predetermined value. In contrast with this, in the input control device 1 according to the variant of Embodiment 4, the threshold correcting unit 17 sets each of the angle thresholds for the respective split areas on the basis of both the angle threshold for a split area corresponding to a reference position on the operation surface of the touch panel 31, and a corresponding one of setup correction coefficients predetermined for the respective split areas, the setup correction coefficients corresponding to respective positions relative to the reference position.

Figure 10A:
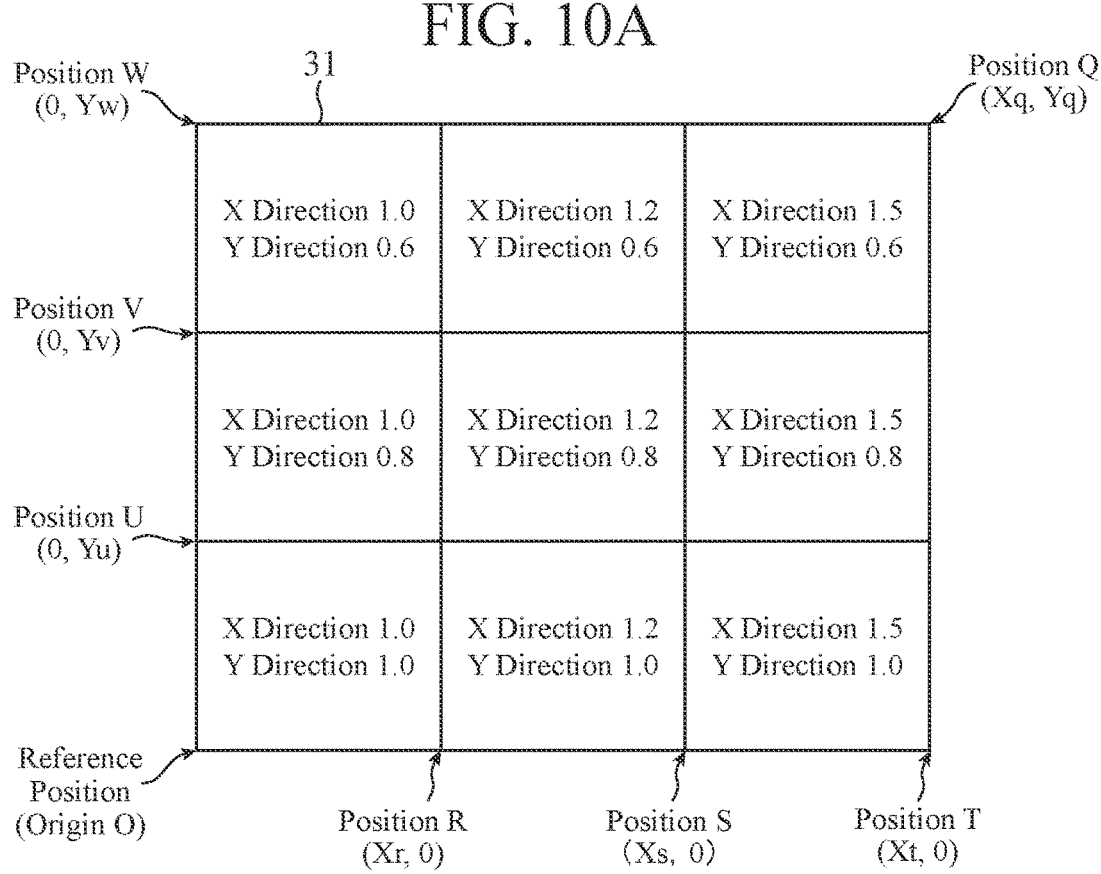
FIG. 10A is a figure showing an example of setup correction coefficients for each split area, for setting up a left side angle threshold in an input control device according to a variant of Embodiment 4.

FIG. 10A is a figure showing an example of the setup correction coefficient for each split area, for setting up a left side angle threshold in the input control device 1 according to the variant of Embodiment 4.

Figure 10B:
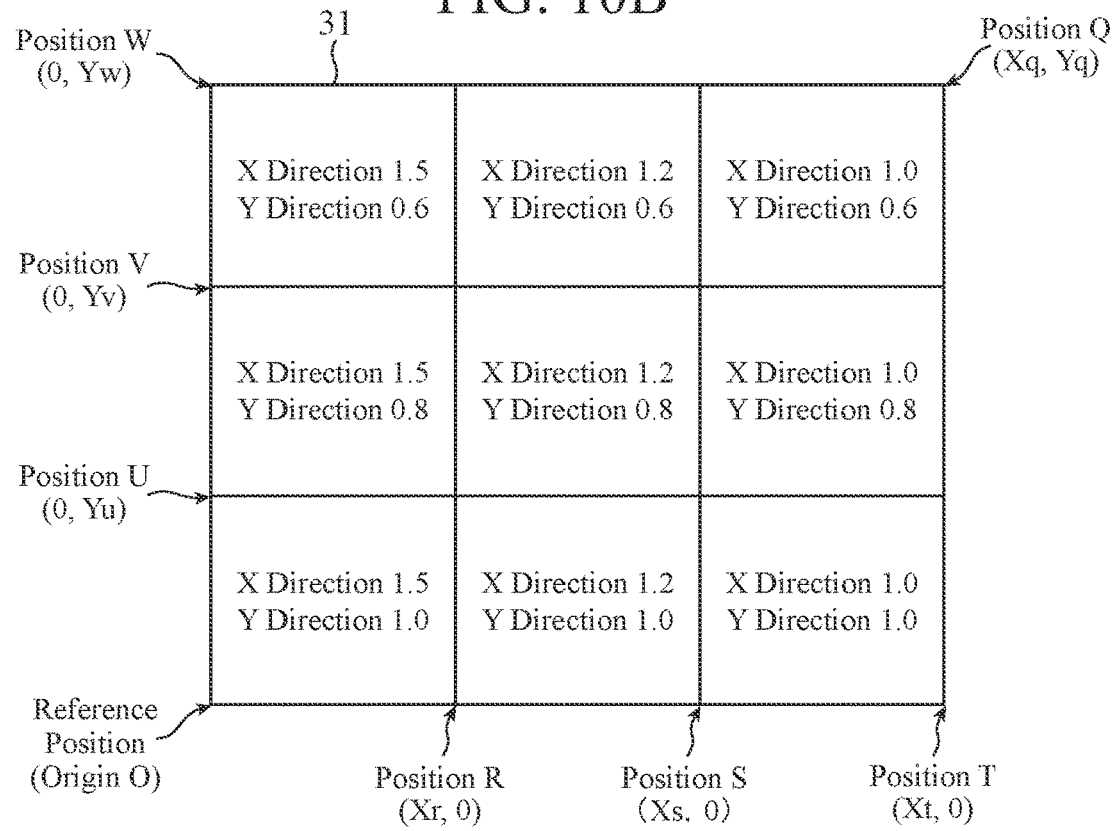
FIG. 10B is a figure showing an example of setup correction coefficients for each split area, for setting up a right side angle threshold in the input control device according to the variant of Embodiment 4.

FIG. 10B is a figure showing an example of the setup correction coefficient for each split area, for setting up a right side angle threshold in the input control device 1 according to the variant of Embodiment 4.

FIGS. 10A and 10B show an example in which the operation surface of the touch panel 31 is split into three areas in a right-left direction in the figure and three areas in an up-down direction in the figure, i.e., into nine areas in total, so that the operation surface has the nine split areas.

In FIGS. 10A and 10B, on the operation surface of the touch panel 31, plane coordinates in which the lower left corner of the operation surface of the touch panel 31 is defined as a reference point, i.e., the origin O are set up, like in the case of FIG. 3 in Embodiment 1. Further, a straight line passing through the origin O and being parallel to the X direction is defined as an X axis, and a straight line passing through the origin O and being parallel to the Y direction is defined as a Y axis.

In FIGS. 10A and 10B, the reference position on the operation surface of the touch panel 31 is the origin O. Further, the farthest point from the origin O that is the reference position is referred to as a position Q(Xq, Yq). The intersection of a straight line passing through the position Q and being parallel to the Y axis, and the X axis is referred to as a position T (Xt, 0). Points dividing the section between the origin O and the position T into three equal parts are referred to as R(Xr, 0) and S(Xs, 0) in order from the origin O. The intersection of a straight line passing through the position Q and being parallel to the X axis, and the Y axis is referred to as a position W (0, Yw). Points dividing the section between the origin O and the position W into three equal parts are referred to as U (0, Yu) and V (0, Yv) in order from the origin O. Therefore, for example, in FIGS. 10A and 10B, the split area positioned at the center, out of the nine split areas on the operation surface of the touch panel 31, is an area whose X-direction coordinate ranges from Xr to Xs and whose Y-direction coordinate ranges from Yu to Yv.

In FIG. 10A, the split area corresponding to the origin O that is the reference position is the one including the origin O, i.e., the one positioned at the lower left corner in FIG. 10A, out of the nine split areas on the operation surface of the touch panel 31. Hereinafter, an explanation will be made assuming that the lower and upper limits of the left side angle threshold for the split area are preset to −45 degrees and −30 degrees, respectively, as an example.

In FIG. 10A, a position relative to the reference position means a relative position in the X direction and a relative position in the Y direction. A setup correction coefficient for setting up the left side angle threshold, the setup correction coefficient corresponding to a relative position in the X direction, is, for example, 1.0 when the X coordinate is between 0 and Xr, 1.2 when the X coordinate is between Xr and Xs, and 1.5 when the X coordinate is between Xs and Xt. Further, a setup correction coefficient for setting up the left side angle threshold, the setup correction coefficient corresponding to a relative position in the Y direction, is, for example, 1.0 when the Y coordinate is between 0 and Yu, 0.8 when the Y coordinate is between Yu and Yv, and 0.6 when the Y coordinate is between Yv and Yw.

In FIG. 10A, the left side angle threshold for each split area is set up by multiplying the left side angle threshold for the above-mentioned split area corresponding to the reference position by, for example, the above-mentioned setup correction coefficient for setting up the left side angle threshold, the setup correction coefficient corresponding to the relative position in the X direction, and the above-mentioned setup correction coefficient for setting up the left side angle threshold, the setup correction coefficient corresponding to the relative position in the Y direction. For example, the left side angle threshold set for the area, on the operation surface of the touch panel 31, whose coordinates in the X direction range from Xr to Xs and whose coordinates in the Y direction range from Yu to Yv, i.e., the split area positioned at the center out of the nine split areas has a lower limit of −43.2 degrees which is acquired by multiplying −45 degrees by the setup correction coefficient 1.2 corresponding to the relative position in the X direction between Xr and Xs, and the setup correction coefficient 0.8 corresponding to the relative position in the Y direction between Yu and Yv, and an upper limit of −28.8 degrees which is acquired by multiplying −30 degrees by the above-mentioned coefficients 1.2 and 0.8.

Similarly, in FIG. 10B, the split area corresponding to the origin O that is the reference position is the one including the origin O, i.e., the one positioned at the lower left corner in FIG. 10B, out of the nine split areas on the operation surface of the touch panel 31. Hereinafter, an explanation will be made assuming that the lower and upper limits of the right side angle threshold for the split area are preset to 30 degrees and 45 degrees, respectively, as an example.

In FIG. 10B, a position relative to the reference position means a relative position in the X direction and a relative position in the Y direction. A setup correction coefficient for setting up the right side angle threshold, the setup correction coefficient corresponding to a relative position in the X direction, is, for example, 1.5 when the X coordinate is between 0 and Xr, 1.2 when the X coordinate is between Xr and Xs, and 1.0 when the X coordinate is between Xs and Xt. Further, a setup correction coefficient for setting up the right side angle threshold, the setup correction coefficient corresponding to a relative position in the Y direction, is, for example, 1.0 when the Y coordinate is between 0 and Yu, 0.8 when the Y coordinate is between Yu and Yv, and 0.6 when the Y coordinate is between Yv and Yw.

In FIG. 10B, the right side angle threshold for each split area is set up by multiplying the right side angle threshold for the above-mentioned split area corresponding to the reference position by, for example, the above-mentioned setup correction coefficient for setting up the right side angle threshold, the setup correction coefficient corresponding to the relative position in the X direction, and the above-mentioned setup correction coefficient for setting up the right side angle threshold, the setup correction coefficient corresponding to the relative position in the Y direction. For example, the right side angle threshold set for the area, on the operation surface of the touch panel 31, whose coordinates in the X direction range from Xr to Xs and whose coordinates in the Y direction range from Yu to Yv, i.e., the split area positioned at the center out of the nine split areas has a lower limit of 28.8 degrees which is acquired by multiplying 30 degrees by the setup correction coefficient 1.2 corresponding to the relative position in the X direction between Xr and Xs, and the setup correction coefficient 0.8 corresponding to the relative position in the Y direction between Yu and Yv, and an upper limit of 43.2 degrees which is acquired by multiplying 45 degrees by the above-mentioned coefficients 1.2 and 0.8.

Although the origin O on the operation surface of the touch panel 31 is defined as the reference position, the reference position is not limited to this.

Further, the above-mentioned setup correction coefficients and the angle threshold for the split area corresponding to the reference position are only examples, and no limitation thereto is intended.

Further, although the above-mentioned angle threshold for each split area is set up by multiplying the lower and upper limits of the angle threshold for the split area corresponding to the reference position by the same setup correction coefficients, no limitation thereto is intended. For example, the lower and upper limits of the angle threshold for the split area corresponding to the reference position may be multiplied by different predetermined setup correction coefficients. Further, for example, a predetermined setup correction coefficient may be added or subtracted to or from the lower and upper limits of the angle threshold for the split area corresponding to the reference position.

With the configuration as described above, the input control device 1 can lessen the time and effort required to set up the angle threshold for each split area, in comparison with the input control device 1 according to Embodiment 4.

Although in the display device 3 in the display system 2 to which the input control device 1 according to any one of the above-described embodiments is applied, the single display unit 32 is provided, no limitation thereto is intended, and it is also possible to apply the input control device 1 to a display device having multiple display units.

Further, although in the display device 3 in the display system 2 to which the input control device 1 according to any one of the above-described embodiments is applied, the display unit 32 has a planar surface shape, no limitation thereto is intended, and it is also possible to apply the input control device 1 to a display device having a display unit with a curved surface shape.

Further, although the example in which the input control device 1 according to any one of the above-described embodiments is applied to the display system 2 is shown, the input control device 1 may be applied to the display device 3 and thereby, for example, the display device 3 may have the configuration of the input control device 1.

A free combination of two or more of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

The input control device according to the present disclosure can be applied to equipment, including a display device, on which users perform an input operation.

REFERENCE SIGNS LIST 1 input control device, 2 display system, 3 display device, 11 touch information acquiring unit, 12 touch angle calculating unit, 13 operating direction estimating unit, 14 input control information outputting unit, 15 detection information acquiring unit, 16 relative position estimating unit, 17 threshold correcting unit, 18 touch panel angle acquiring unit, 19 operator angle acquiring unit, 21 sensor, 31 touch panel, 32 display unit, 33 display control unit, 201 processing circuit, 202 HDD, 203 input interface device, 204 output interface device, 205 memory, and 206 CPU.

The invention claimed is:

1. An input control device comprising:
processing circuitry
to acquire touch information from a touch panel;
to calculate an angle of a touched area on an operation surface of the touch panel on a basis of the touch information acquired, said angle of the touched area being a relative angle, on an xyplane of the operation surface of the touch panel, with respect to a predetermined direction on the operation surface of the touch panel;
to estimate a direction of an operator who has touched the touch panel, on a basis of both the calculated angle of the touched area, and at least one angle threshold;
to acquire detection information from a sensor to detect a part of the operator's body;
to estimate a relative position of the part of the operator's body with respect to the touch panel on a basis of the detection information acquired; and
to correct the angle threshold on a basis of the estimated relative position of the part of the operator's body with respect to the touch panel.

2. The input control device according to claim 1, wherein the processing circuitry acquires a direction in which the operation surface of the touch panel is directed, and
the processing circuitry changes a correction coefficient used in correcting the angle threshold, in accordance with the acquired direction in which the operation surface of the touch panel is directed.

3. The input control device according to claim 2, wherein the processing circuitry acquires a direction in which the operator's body is directed, and
the processing circuitry changes the correction coefficient used in correcting the angle threshold, in accordance with both the acquired direction in which the operation surface of the touch panel is directed, and the acquired direction in which the operator's body is directed.

4. The input control device according to claim 1, wherein the processing circuitry corrects angle thresholds set for respective split areas into which the operation surface of the touch panel is split.

5. The input control device according to claim 4, wherein the processing circuitry sets each of the angle thresholds for the respective split areas on a basis of both one of the angle thresholds which is set for one of the split areas which is corresponding to a reference position on the operation surface of the touch panel, and a corresponding one of setup correction coefficients predetermined for the respective split areas, the setup correction coefficients corresponding to respective positions relative to the reference position.

6. A display device comprising the input control device according to claim 1.

7. An input control method comprising:
acquiring touch information from a touch panel;
calculating an angle of a touched area on an operation surface of the touch panel on a basis of the touch information acquired, said angle of the touched area being a relative angle, on an xy-plane of the operation surface of the touch panel, with respect to a predetermined direction on the operation surface of the touch panel;
estimating a direction of an operator who has touched the touch panel, on a basis of both the calculated angle of the touched area, and at least one angle threshold;
acquiring detection information from a sensor to detect a part of the operator's body;
estimating a relative position of the part of the operator's body with respect to the touch panel on a basis of the detection information acquired; and
correcting the angle threshold on a basis of the estimated relative position of the part of the operator's body with respect to the touch panel.

8. The input control device according to claim 2, wherein the processing circuitry corrects angle thresholds set for respective split areas into which the operation surface of the touch panel is split.

9. The input control device according to claim 8, wherein the processing circuitry sets each of the angle thresholds for the respective split areas on a basis of both one of the angle thresholds which is set for one of the split areas which is corresponding to a reference position on the operation surface of the touch panel, and a corresponding one of setup correction coefficients predetermined for the respective split areas, the setup correction coefficients corresponding to respective positions relative to the reference position.

10. The input control device according to claim 3, wherein the processing circuitry corrects angle thresholds set for respective split areas into which the operation surface of the touch panel is split.

11. The input control device according to claim 10, wherein the processing circuitry sets each of the angle thresholds for the respective split areas on a basis of both one of the angle thresholds which is set for one of the split areas which is corresponding to a reference position on the operation surface of the touch panel, and a corresponding one of setup correction coefficients predetermined for the respective split areas, the setup correction coefficients corresponding to respective positions relative to the reference position.

* * * * *